April 7, 1964    C. VAN DER LELY ETAL    3,127,726
DEVICES FOR LATERALLY DISPLACING CROP LYING ON THE GROUND
Original Filed July 3, 1956    3 Sheets-Sheet 1

INVENTOR.

BY

INVENTOR.

BY

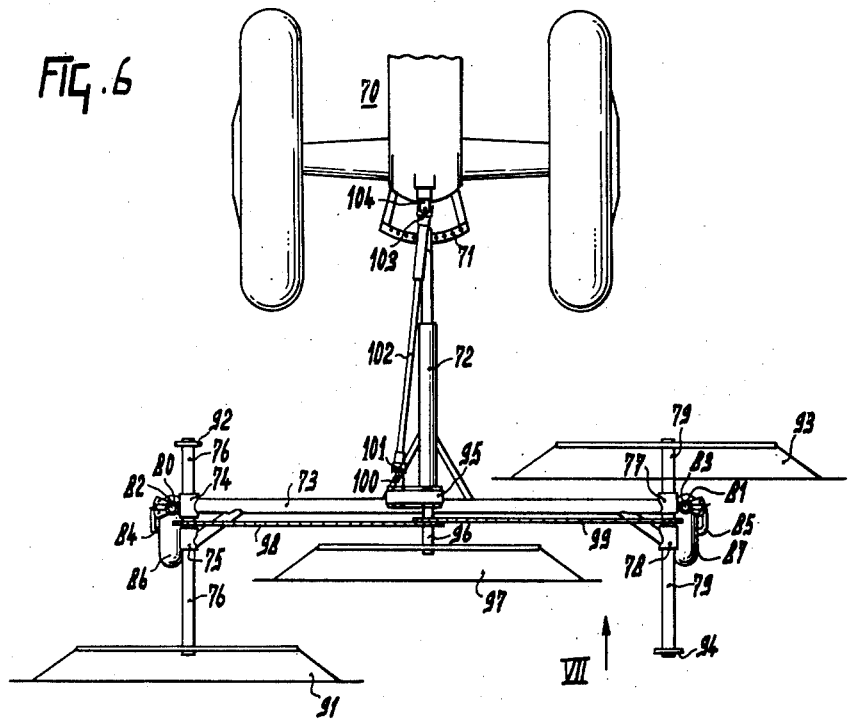
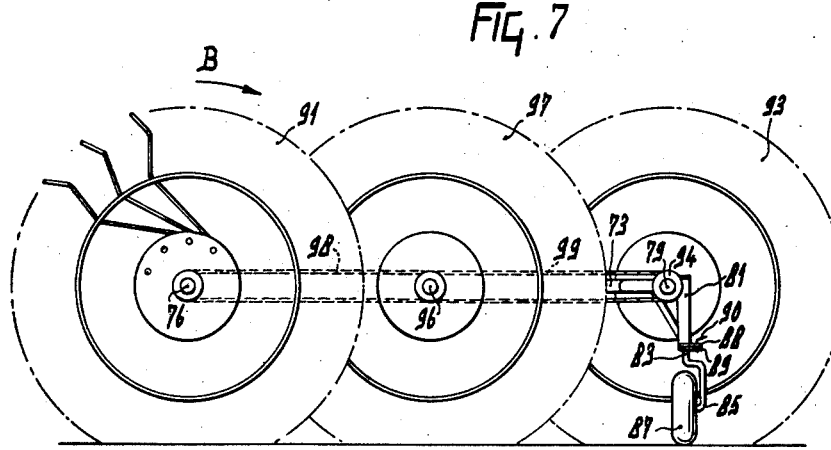

United States Patent Office 3,127,726
Patented Apr. 7, 1964

3,127,726
DEVICES FOR LATERALLY DISPLACING CROP LYING ON THE GROUND
Cornelis van der Lely, Zug, Switzerland, and Ary van der Lely, Maasland, Netherlands, assignors to C. van der Lely N.V., Maasland, Netherlands, a Dutch limited liability company
Continuation of application Ser. No. 595,659, July 3, 1956. This application Sept. 7, 1960, Ser. No. 54,430
Claims priority, application Netherlands July 5, 1955
24 Claims. (Cl. 56—366)

The invention relates to devices for laterally displacing crop lying on the ground and comprising a frame and rake wheels rotatable about axles which are fixed to said frame, each of said rake wheels being connected via coupling members to a driving device for driving said rake wheels. This application is a continuation of applicants' prior application Serial No. 595,659, which is now abandoned.

It is an object of the present invention to provide an improved device which can be used as a rake, a swath turner or a tedder, and in which the raking members are positively driven.

According to the invention, the improved device has a first working position in which it constitutes a side-delivery rake and in which position at least one rake wheel further displaces material which has been displaced by a preceding rake wheel. The device also has a second working position in which one or more rake wheels displace the crop independently.

The driving device for the rake wheels can remain very simple and according to an extremely favorable embodiment of the invention each rake wheel can be provided with a driving device whereby the wheel is driven in the same direction of rotation in the first and the second working positions of the device.

Further, the invention contemplates the provision of special wheel supports so that the associated driving devices can be of simple construction.

In further accordance with the invention, provision is made so that the wheel pressures on the ground will be balanced.

Figures 1, 2:
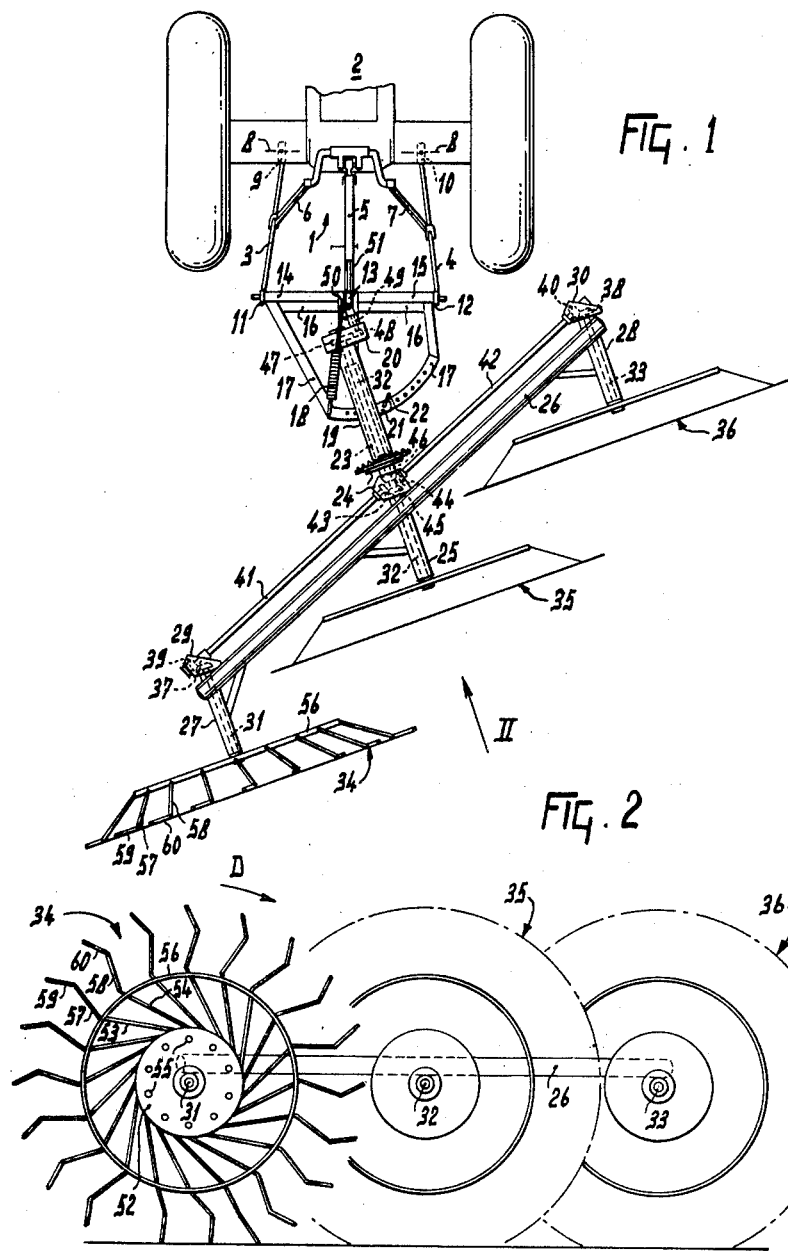
Figure 5:
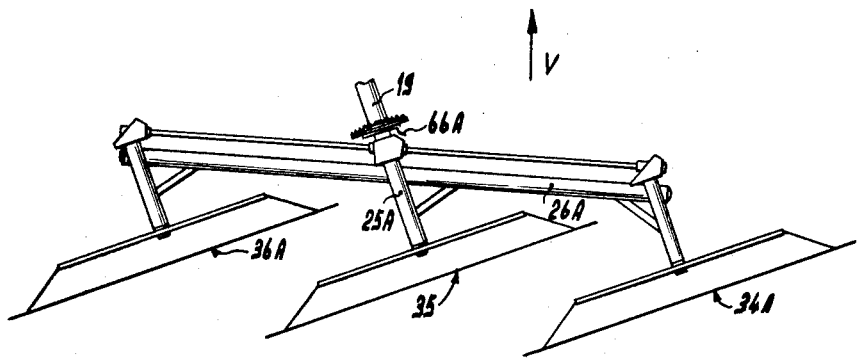
Figures 3, 4:
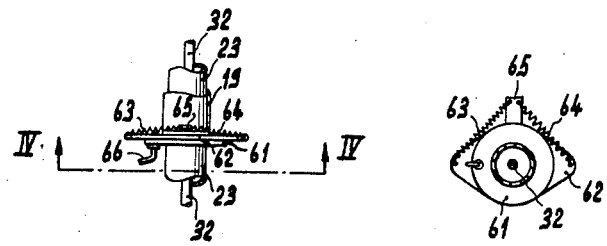

Further features and details will be hereinafter more fully described with reference to the accompanying drawing in which two preferred embodiments of the invention are illustrated by way of example and in which:

FIG. 1 is a plan view of a first embodiment of the invention in which an implement is attached to the lifting device of a tractor and is intended for use as a side-delivery rake, FIG. 2 is a side view of the same device seen in the direction of arrow II in FIG. 1, FIG. 3 represents a detail of FIG. 1 in enlarged scale, FIG. 4 shows a section of the construction of FIG. 3 taken along line IV—IV in said figure and also in enlarged scale, FIG. 5 is a plan view of the device as a tedder.

Figure 8:
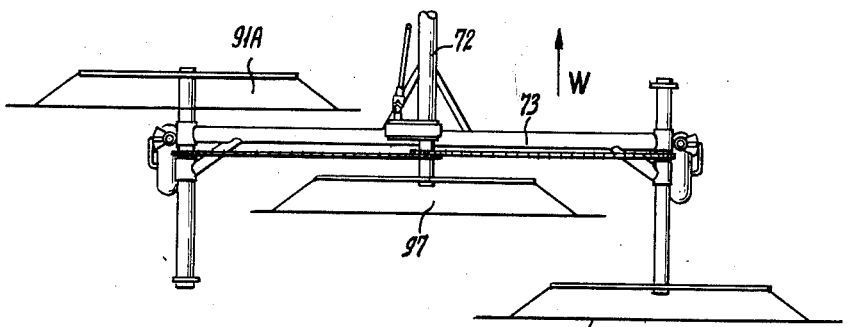

FIG. 6 is a plan view of a second embodiment of the invention as a side-delivery rake, FIG. 7 is a side view of the device of FIG. 6 as seen in the direction of arrow VII in FIG. 6, and FIG. 8 illustrates the device of FIGS. 6 and 7 as a tedder.

The device shown in FIG 1 is attached to the lifting device 1 of a tractor 2. The lifting device consists of three arms 3, 4 and 5, the arms 3 and 4 being coplanar and nearly horizontal. The arms 3 and 4 can be raised and dropped by means of draw bars 6 and 7 driven by means of engine power the arms turning around a horizontal axis 8 including the hinges 9 and 10 of the arms 3 and 4. The arm 5 is situated at a higher level than the arms 3 and 4. The hindmost extremities 11, 12 and 13 of the arms 3, 4 and 5 are hingedly connected to a triangular frame, the inclined limbs of which are the strips 14 and 15. The lower ends of the strips 14 and 15 are connected by means of a strip 16. A strip 17 curved in a horizontal plane is hingedly attached to the strip 16, and the strip 17 can pivot about a line connecting arm ends 11 and 12. A draw spring 18 fixes the strip 17 to the end 13.

A horizontal tube 19 carries at its foremost extremity a gear box 20. Said gear box 20 is connected rotatably to the center of the strip 16. Further, the tube 19 carries a perforated, horizontal lip 21 which rests upon the strip 17. The strip 17 is perforated so that the tube 19 can be secured thereto in different positions by means of a locking pin 22 which can be inserted through the lip 21 and the strip 17 at the same time.

A tube 23 is rotatably supported in the tube 19. The tube 23 projects at the rear of the tube 19 and is fixedly connected to a toothed-wheel box 24 which carries a tube 25 being in alignment with the tube 23.

The tube 25 is fixedly connected to the center of a cross beam or frame 26, to the ends of which tubes 27 and 28 are attached in parallel to the tube 25. The foremost extremities of said tubes carry toothed-wheel boxes 29 and 30.

In the tubes 27, 25 and 28 are supported axles 31, 32 and 33, the rear extremities of which carry raking wheels 34, 35 and 36. The foremost extremities of the axles 31 and 33 are located in the gear boxes 29 and 30 and carry conical toothed wheels 37 and 38. Said toothed wheels engage conical toothed wheels 39 and 40 on axles 41 and 42 extending into the toothed-wheel box 24 and provided with conical toothed wheels 43 and 44 engaging conical toothed wheels 45 and 46 on the axle 32. Thus, the rake wheels 34, 35 and 36 rotate at the same rotational speed as the axle 32 extending through the tube 23. The front end of the axle 32 carries a toothed wheel 47 in the toothed-wheel box 20, said toothed wheel being driven by means of a driving wheel 48 on an axle axle 49. The axle 49 is coupled by means of a universal joint 50 to the power-take-off device 51 of the tractor 2. In this manner, the rake wheels 34–36 can be driven in the direction of rotation D (see FIG. 2) by means of the engine of the tractor.

The rake wheels 34–36 all have the same construction which will be more fully described for the rake wheel 34. Said wheel consists of a disc 52 mounted on the axle 31 and to which spokes (see spokes 53 and 54) made of steel wire are attached by means of bolts 55. The spokes extend through recesses in a rim 56 and continue outside said rim as arms 57 and 58, the extremities 59 and 60 of which are at an angle to constitute the tines of the rake wheel. The spokes 53 and 54 are located in a plane perpendicular to the axle 31 and the tines 59 and 60, in unloaded position, are situated in a different plane perpendicular to the axle. The bearing arms 57 and 58 define a conical surface and lie in planes passing through the axle 31.

In FIGS. 3 and 4, it is seen that the tube 23 carries a flange 61 at a position whereat said tube enters into the tube 19. An oblong, loose flange 62 is mounted adjacent the flange 61 on the tube 23, the lower ends of two springs 63 and 64 being attached to flange 62. The upper ends of said springs are attached to a lip 65 mounted on the tube 19. Thus the springs tend to keep the flange 62 in a fixed position. The flange 61 can be coupled to the flange 62 by means of a locking pin 66 which provides for two positions, viz the illustrated position and a position displaced 180° about the center line of the tube 25. The latter position of the flange 61 is visible in FIG. 5 and requires that the tube 25 and the beam 26 also turn 180°. Said members are designated in said latter position as members 25A and 26A. The locking pin 66 then is located in position 66A and the rake wheels 34 and 36 have reached positions 34A and 36A, but the rake wheel 35 has maintained its position.

The use and the working of the implement described are as follows. The tractor 2 is driven over land which is to be worked, and the lifting device 1 is lifted sufficiently that the rake wheels 34, 35 and 36 rest with a suitable pressure on the ground, the remaining portion of the weight being carried by the lifting device 1. As a consequence of the presence of the spring 18, this position is not very critical. The pressure of the three rake wheels on the ground is practically equal on even terrain and, on uneven terrain, the pressure of the rake wheels 34 and 36 on the ground is practically equal, because the axles 31, 32 and 33 are coplanar and the beam 26 is rotatable about the center line of the axle 32. When the locking pin 66 is employed, the beam is actually not freely rotatable, because the springs 63 and 64 tend to keep the beam in a horizontal position, but the difference in pressure on the ground of the rake wheels 34 and 36 is not substantial. One of the advantages of the presence of the springs 63 and 64 is that upon elevating the lifting device, all three rake wheels will leave the ground almost simultaneously so that the device can easily be put out of operation. A further advantage of the presence of the springs 63 and 64 is the possibility of imparting to said springs a difference in tension whereby the driving of the axle 32 is compensated for during normal operation. In principle, the spring 63 can have no tension so that, in principle, a single spring can be used.

When the implement of FIGS. 1 and 2 is moved over terrain by means of the tractor 2 having rotating rake wheels 34, 35 and 36, it will work as a side-delivery rake. The rake wheel 36 delivers crop to the left which is displaced further to the left along with other crop by means of the rake wheel 35. Finally, the rake wheel 34 discharges all of said crop so that the strip of ground being worked by the device is left in a clean state. The rotation of the rake wheels 34, 35 and 36 is greater than would be if the rake wheels were to be freely rotatable about their axles. In the first place, the rake wheels can be situated at right angles to the direction of travel, so that the device has a maximum effective working width. The working width, however, can be adjusted by releasing the pin 22 and causing the tube 23 to make a different angle with the travelling direction. In the second place, as a result of the relatively rapid rotation of the rake wheels, the tines which are in contact with the ground move, with regard to the ground, in a direction which makes an angle with the axle of said rake wheel. The tines of rake wheels set in motion by contact with the ground move with regard to the ground substantially in the direction of the axle of the associated rake wheel.

With pin 66 released and beam 26 turned by an angle of 180° about the center line of the tube 19, and then pin 66 inserted in position 66A and portions 61 and 62 fixed with regard to each other, a new working position of the implement is attained as shown in FIG. 5. The new positions of the rake wheels 34 and 36 and the beam 26 are designated by 34A, 36A and 26A. The rake wheels 36A, 35 and 34A continue their rotation in the same direction, but now they cannot deliver crop to each other with the implement moving in direction V. The device is thus converted into a teddering device in a very simple manner.

The embodiment shown in FIGS. 6 and 7 is intended for being pulled by a tractor. To that end, a tractor 70 is provided with a strip 71 to which a horizontal arm 72 of the device can be fixed. The arm 72 is fixedly attached to a transverse horizontal beam or frame 73. Two bearings 74 and 75 for a horizontal axle 76 are connected to the left end of said beam 73, whereas two bearings 77 and 78 for an axle 79 are connected to the right end of the beam 73. The axles 76 and 77 are parallel to the arm 72. Vertical tubes 80 and 81 are connected to the ends of the beam 73, vertical axles 82 and 83 being mounted in said tubes 80 and 81. The vertical axles 82 and 83, respectively, are connected with horizontal axles 84 and 85 of running wheels 86 and 87, respectively, and are each formed from a single bar. Said running wheels 86 and 87 are such that if the axles 82 and 83 are not secured, the running wheels are self-adjusting. Moreover, the lower end of each of the tubes 80 and 81 is provided with a perforated lip 88 and each of the axles 82 and 83 carries a perforated sector 89, so that if desired the vertical axle of each of the running wheels can be secured in any given position by means of a locking pin 90 which is inserted through the associated lip 88 and sector 89. It is also possible to secure one of the running wheels and to let the other one remain self-adjustable.

The rear end of the axle 76 carries a rake wheel 91 which, however, can easily be released and then mounted on a fastening or supporting member 92 on the front of the axle 76. The front end of the axle 79 carries a rake wheel 93 which can also be easily released and placed on a fastening or supporting member 94 on the rear end of the axle 79.

To the beam 73 is fixed a toothed-wheel box 95 in which a horizontal axle 96 is supported carrying, at its rearmost end, a rake wheel 97. The axle 96 is parallel to the axles 76 and 79 and is coupled to said axles by means of chains 98 and 99 in such a way that the rake wheels 91, 97 and 93 rotate continuously with mutually equal velocities during rotation of the axle 96. Through driving gear incorporated in gear box 95, the axle 96 is driven by an axle 100 which via a first universal joint 101, a telescopic axle 102 and a second universal joint 103 is coupled to the power-take-off device 104 of the tractor 70. By driving the power-take-off device, the rake wheels will be caused to rotate in the direction of arrow B in FIG. 7.

The working of the latter device, which is provided with the same kind of rake wheels as the device shown in FIGS. 1 and 2, does not differ essentially from the device of FIGS. 1 and 2. In use, there is some difference in-so-far as for causing the working width to decrease one running wheel or both running wheels must be put in an oblique position by turning the axles 82 and/or 83 to the right, owing to which oblique position the planes of the rake wheels will substantially reach the same position as shown in FIG. 1.

The device according to FIGS. 6 and 7 can be transformed in a very simple manner into a tedder by releasing the rake wheels 91 and 93 and by mounting them in the positions which are designated in FIG. 8 as 90A and 93A. All rake wheels rotate in the same direction after said transformation as before. In principle the working of said tedder does not differ from that of the tedder according to FIG. 5. By adjusting the runing wheels, there can be obtained an operation by which the rake wheels have a position which relative to the travelling direction is oblique instead of transverse.

What we claim is:

1. A raking device for laterally displacing material lying on the ground and capable of operation in a first arrangement as a tedder with raking elements in a first working position and in a second arrangement as a side delivery rake with the raking elements in a second different working position; said device comprising a frame, a plurality of axles on said frame, a plurality of rake wheels constituting the raking elements on said axles and operatively associated in tedding arrangement, drive means coupled to said rake wheels for rotating the same, the device further comprising fastening means on said axles for maintaining the rake wheels selectively and detachably in said tedding arrangement and in said arrangement as a side delivery rake, said fastening means defining at least two rows, said rake wheels being detachably engageable with said fastening devices.

2. A device as claimed in claim 1 wherein said axles have a fixed position with respect to said frame and relative to each other.

3. A device as claimed in claim 2 wherein said last mentioned means includes a tubular support operatively associated with said frame for the rotation thereof.

4. A device for attachment to a tractor having a source of power and as claimed in claim 2, comprising a tube coupled to the frame and adapted for connection to the tractor, said drive means including an axle extending through the tube for connection to said source.

5. A device as claimed in claim 2 wherein said frame includes opposite extremities, said device further including running wheels connected to said opposite extremities.

6. A device as claimed in claim 2 comprising an axle, said frame being rotatable about the axle, a toothed wheel on said axle, a toothed wheel coupled to at least one of said rake wheels, and an axle coupling said toothed wheels for the driving of said one rake wheel.

7. A device as claimed in claim 2 comprising a spring operatively associated with said frame for counteracting a rotation of the frame resulting from driving the rake wheels.

8. A raking device for laterally displacing material lying on the ground, said device comprising a frame, a plurality of axles mounted on said frame and having a fixed position with respect to said frame, fastening devices on said axles, a plurality of rake wheels constituting raking elements on said fastening devices of said axles, drive means coupled to said rake wheels for rotating the same, at least one rake wheel being mounted on either side of said frame.

9. A raking device as claimed in claim 8 wherein said frame is supported by at least two running wheels which are pivotable about a vertical axis and may be fixed in a number of positions.

10. A raking device as claimed in claim 9 wherein said rake wheels are placed in overlapping arrangement to provide a foremost rake wheel and a hindmost rake wheel, one of said running wheels being situated behind the foremost rake wheel and the other of said running wheels being situated before the hindmost rake wheel.

11. A raking device as claimed in claim 9, wherein each of said rake wheels has side surfaces, one of which is in contact with the displaced material, said frame extending parallel to said side surfaces of said rake wheels.

12. A raking device as claimed in claim 9, comprising coupling means to couple said drive means to the tractor whereby the drive means can be driven by the tractor.

13. A raking device as claimed in claim 12, wherein said coupling means are situated at a substantially equal distance from said foremost rake wheel and said hindmost rake wheel.

14. A raking device for laterally displacing material lying on the ground and capable of operation in a first arrangement as a tedder with raking elements in a determinable working position and in a second arrangement as a side delivery rake with the raking elements in a different working position; said device comprising a frame, a plurality of axles on said frame, a plurality of rake wheels constituting the raking elements on said axles and operatively associated in tedding arrangement, drive means coupled to said rake wheels for rotating the same, and means on said frame for maintaining the rake wheels selectively in said tedding arrangement and in said arrangement as a side delivery rake, said device further comprising fastening devices on said axles, said rake wheels being detachably engageable with said fastening devices.

15. A raking device as claimed in claim 14, wherein said rake wheels have side surfaces, one side surface of each rake wheel being directed towards the drive means in said tedding arrangement and in said arrangement as a side delivery rake, the opposite side surface of said rake wheel is directed towards said drive means.

16. A raking device for laterally displacing material lying on the ground and capable of operation in a first arrangement as a tedder with raking elements in a determinable working position and in a second arrangement as a side delivery rake with the raking elements in a different working position; said device comprising a frame, a plurality of axles on said frame, a plurality of rake wheels constituting the raking elements on said axles and operatively associated in tedding arrangement, drive means coupled to said rake wheels for rotating the same, and means on said frame for maintaining the rake wheels selectively in said tedding arrangement and in said arrangement as a side delivery rake, said device further comprising fastening devices on said axles, said rake wheels being detachably engageable from said fastening devices, said drive means being adapted to drive the rake wheels in one direction of rotation only.

17. A raking device for laterally displacing material lying on the ground and capable for operation in a first arrangement as a tedder with raking elements in a determinable working position and in a second arrangement as a side delivery rake with the raking elements in a different working position; said device comprising a frame, a plurality of axles on said frame, a plurality of rake wheels constituting the raking elements on said axles and operatively associated in tedding arrangement, drive means coupled to said rake wheels for rotating the same, and means on said frame for maintaining the rake wheels selectively in said tedding arrangement and in said arrangement as side delivery rake, the last said means defining an axis, said frame being rotatable about said axis.

18. A device as claimed in claim 17, wherein said means includes a tubular support operatively associated with said frame for the rotation thereof.

19. A device as claimed for attachment to a tractor having a source of power and as claimed in claim 17, comprising a tube coupled to the frame and adapted for connection to the tractor, said drive means including an axle extending through the tube for connection to said source.

20. A device as claimed in claim 17 comprising an axle, said frame being rotatable about the axle, a toothed wheel on said axle, a toothed wheel coupled to at least one of said rake wheels, and an axle coupling said toothed wheels for the driving of said one rake wheel.

21. A device as claimed in claim 17 comprising a spring operatively associated with said frame for counteracting rotation of the frame resulting from driving the rake wheels.

22. A device for laterally displacing material lying on the ground comprising a frame including a frame beam, rotatable rake wheels arranged in echelon along said frame beam, fastening means for mounting said rake wheels on said frame beam, each of said mounting means rotatably mounting each of said rake wheels on said frame beam and providing a constant vertical relationship between said frame and each of said rake wheels, means driving said rake wheels in rotation, each rake wheel including a rigid center portion, a rim, a plurality of resilient supporting rods coupled to said rigid center portion and engaging said rim and a resilient raking tooth operatively associated with and extending outwardly from each said rod.

23. A device as claimed in claim 22, wherein each raking tooth and its corresponding supporting rod are constituted by a single piece of wire and the supporting rod constitutes a torsion section for said tooth enabling twisting thereof.

24. A device for laterally displacing material lying on the ground and adapted for attachment to a tractor having a source of power, said device comprising: a frame including a frame beam, rotatable rake wheels arranged in echelon along said frame beam, fastening means mounting each of said rake wheels on said frame beam and providing a constant vertical relationship between said frame and each of said rake wheels, a plurality of resilient raking teeth extending outwardly from each of said rake wheels, driving means rotating said rake wheels, said driving means including an axle having opposite ends, coupling means at one of said ends of said axle coupling said axle to the tractor in driving relation, one of the rake wheels being coupled to the other end of said axle, the other rake wheels being on both sides of said one rake wheel, and means extending parallel to said frame beam and coupling said other rake wheels to said axle in driving relation.

References Cited in the file of this patent

UNITED STATES PATENTS 720,098     Bamford _____ Feb. 10, 1903

FOREIGN PATENTS 674,797     Great Britain _____ July 2, 1952
532,560     Belgium _____ Oct. 30, 1954